(12) United States Patent
Wang (10) Patent No.: US 8,869,211 B2
(45) Date of Patent: Oct. 21, 2014

(54) ZOOMABLE CONTENT RECOMMENDATION SYSTEM

(71) Applicant: Haohong Wang, San Jose, CA (US)

(72) Inventor: Haohong Wang, San Jose, CA (US)

(73) Assignee: TCL Research America Inc., Santa Clara, CA (US)

( * ) Notice: Subject to any disclaimer, the term of this patent is extended or adjusted under 35 U.S.C. 154(b) by 57 days.

(21) Appl. No.: 13/663,706

(22) Filed: Oct. 30, 2012

(65) Prior Publication Data

US 2014/0123179 A1    May 1, 2014

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/443 | (2011.01) |
| G06F 17/22 | (2006.01) |
| H04N 21/466 | (2011.01) |
| H04N 21/25 | (2011.01) |
| H04N 21/45 | (2011.01) |
| H04N 21/431 | (2011.01) |

(52) U.S. Cl.
CPC ....... *H04N 21/4826* (2013.01); *H04N 21/4438* (2013.01); *G06F 17/2241* (2013.01); *H04N 21/482* (2013.01); *H04N 21/466* (2013.01); *H04N 21/4668* (2013.01); *H04N 21/25* (2013.01); *H04N 21/45* (2013.01); *H04N 21/431* (2013.01); *H04N 21/251* (2013.01); *H04N 21/4312* (2013.01)
USPC .................. 725/61; 725/37; 725/38; 725/44; 725/56; 725/52

(58) Field of Classification Search
CPC .. G06F 17/2241; H04N 21/25; H04N 21/251; H04N 21/431; H04N 21/4312; H04N 21/4438; H04N 21/466; H04N 21/4668; H04N 21/482; H04N 21/4826
USPC ....................................................... 725/37–61
See application file for complete search history.

(56) References Cited

U.S. PATENT DOCUMENTS

| | | | | |
|---|---|---|---|---|
| 6,026,198 | A * | 2/2000 | Okada ........................... | 382/247 |
| 7,937,726 | B2 | 5/2011 | Nashida et al. | |
| 2006/0218588 | A1* | 9/2006 | Kelts ............................... | 725/39 |
| 2008/0201352 | A1* | 8/2008 | Monro .......................... | 707/102 |
| 2010/0077431 | A1* | 3/2010 | Neufeld et al. ................ | 725/39 |
| 2010/0094866 | A1* | 4/2010 | Cuttner et al. ................ | 707/723 |
| 2010/0126332 | A1* | 5/2010 | Kobayashi .................... | 84/613 |
| 2012/0131495 | A1* | 5/2012 | Goossens et al. ............. | 715/782 |
| 2012/0143849 | A1* | 6/2012 | Wong et al. ................... | 707/722 |

FOREIGN PATENT DOCUMENTS

CN         02826297.2       6/2005

* cited by examiner

*Primary Examiner* — Jeremy Duffield
(74) *Attorney, Agent, or Firm* — Anova Law Group, PLLC (57) ABSTRACT

A method is provided for a content recommendation module. The method includes receiving a user input related to viewing contents from a user and determining whether a recommendation pool containing a plurality of selected recommendation candidates has been changed corresponding to the input. The method also includes, when the recommendation pool has been changed, mapping the plurality of selected recommendation candidates in the changed recommendation pool into a hierarchical data structure with a plurality of levels such that each of the plurality of levels acts as a stage of a zoom operation on the selected recommendation candidates. Further, the method includes rendering mapped recommendation candidates from the plurality of levels to be displayed to the user.

22 Claims, 6 Drawing Sheets

ZOOMABLE CONTENT RECOMMENDATION SYSTEM

FIELD OF THE INVENTION

The present invention relates to the field user interface technologies and, more particularly, to techniques for making zoomable recommendations to users.

BACKGROUND

Content recommendation has become popular recently and often can be seen in online video on demand (VOD) services as well as in smart TVs. In a typical application scenario, a relevant (or most popular) content is listed in a row for selection and the recommended content is listed in a few pages with multiple rows for user to review and select. The order of these content titles generally follows the recommendation strength in a linear sequence. That is, the second page has less strength than the first page, and the bottom row has less strength than the top row.

Such arrangement follows the user's nature sense of using the traditional remote control with clickable buttons for interaction. However, it does not fit into the natural sense of user's hierarchical content discovery interaction. And implementing such hierarchical content discovery requires additional support from both the interaction devices and the content data management software.

The disclosed methods and systems are directed to solve one or more problems set forth above and other problems.

BRIEF SUMMARY OF THE DISCLOSURE

One aspect of the present disclosure includes a method for a content recommendation module. The method includes receiving a user input related to viewing contents from a user and determining whether a recommendation pool containing a plurality of selected recommendation candidates has been changed corresponding to the input. The method also includes, when the recommendation pool has been changed, mapping the plurality of selected recommendation candidates in the changed recommendation pool into a hierarchical data structure with a plurality of levels such that each of the plurality of levels acts as a stage of a zoom operation on the selected recommendation candidates. Further, the method includes rendering mapped recommendation candidates from the plurality of levels to be displayed to the user.

Another aspect of the present disclosure includes a content recommendation module. The content recommendation module includes a database, a user interaction handler, a content remapping unit, and a rendering engine. The database is configured to store a recommendation pool containing a plurality of selected recommendation candidates. The user interaction handler is configured to receive a user input related to viewing contents from a user and to determine whether the recommendation pool has been changed correspondingly to the input. Further, the content remapping unit is configured to, when the recommendation pool has been changed, map the plurality of selected recommendation candidates in the changed recommendation pool into a hierarchical data structure with a plurality of levels such that each of the plurality of levels acts as a stage of a zoom operation on the selected recommendation candidates. The rendering engine is configured to render mapped recommendation candidates from the plurality of levels to be displayed to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
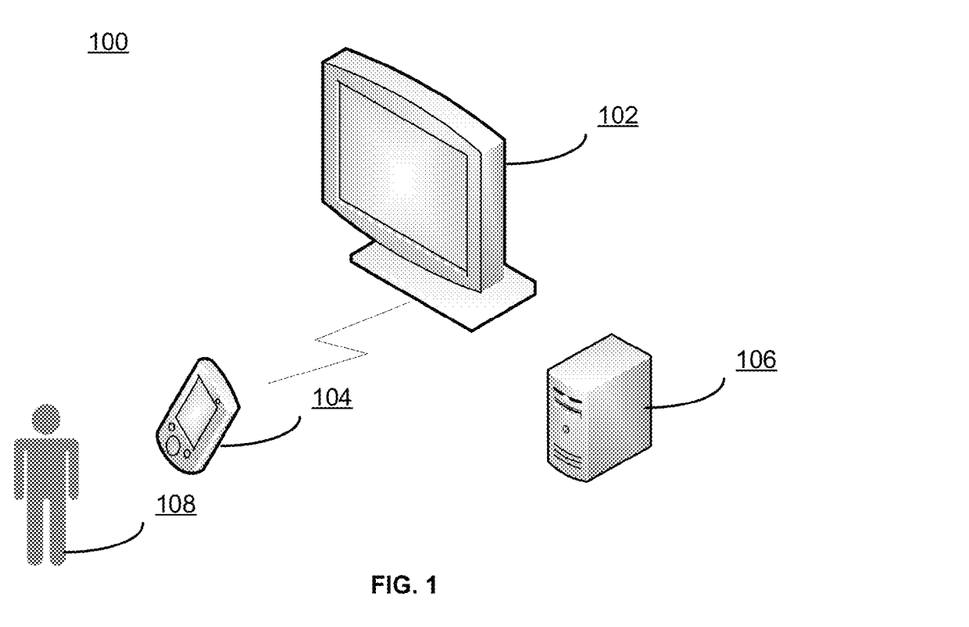
FIG. 1 illustrates an exemplary environment incorporating certain embodiments of the present invention.

FIG. 1 illustrates an exemplary content delivery system 100 incorporating certain embodiments of the present invention. As shown in FIG. 1, content delivery system 100 includes a television set (TV) 102, a remote control 104, and a user 108. Optionally, content delivery system 100 may include a network device 106.

TV 102 may include any appropriate type of TV, such as plasma TV, LCD TV, projection TV, non-smart TV, or smart TV. TV 102 may also include other computing system, such as a personal computer (PC), a tablet or mobile computer, a smart phone, or a server, etc.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

TV 102 may display contents for the user to watch. The TV 102 may obtain such contents from any appropriate sources, such as from a local storage device, from a wired or wireless network device of a service provider, or from the Internet. Further, the contents may include any appropriate contents, such as entertainment, news, games, video, audio, 2D contents, and 3D contents, etc.

Further, the optional network device 106 may include any appropriate type of computing or consumer electronic device to facilitate the communication, data storage, and data processing between the remote control 104 and TV 102. For example, when the content delivery system 100 uses an online service or broadcasting service, a network device from a service provider may provide contents to TV 102. TV 102, remote control 104, and network device 106 may communicate with each other through one or more communication networks.

Figure 2:
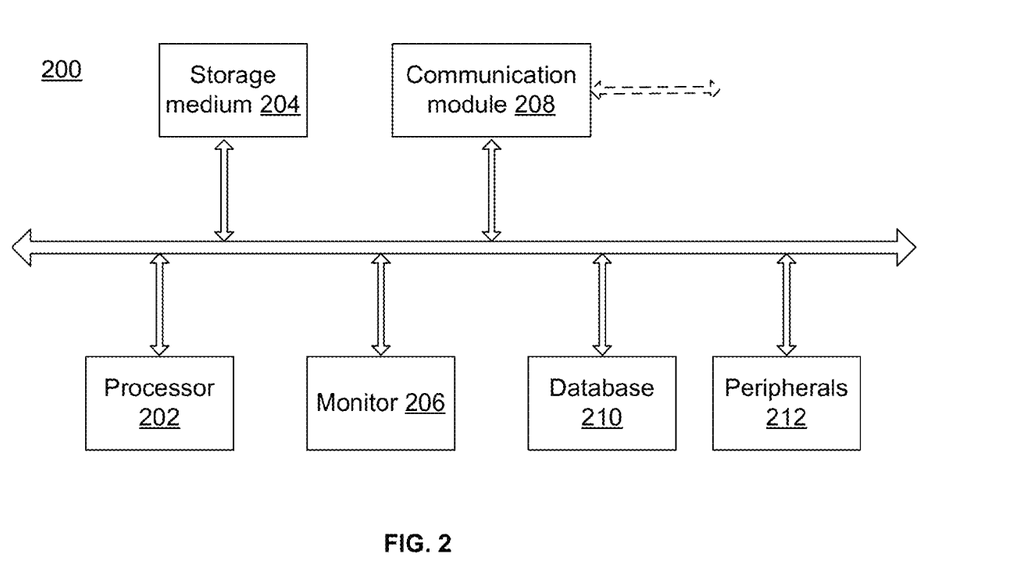
FIG. 2 illustrates an exemplary computing system consistent with the disclosed embodiments.

TV 102, remote control 104, and/or network device 106 may be implemented on any appropriate computing circuitry platform. FIG. 2 shows a block diagram of an exemplary computing system 200 capable of implementing TV 102, remote control 104, and/or network device 106.

As shown in FIG. 2, computing system 200 may include a processor 202, a storage medium 204, a monitor 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as a keypad, keyboard, and mouse, and communication module 208 may include certain network interface devices for establishing connections through communication networks. Database 210 may include one or more databases for storing certain data and for performing certain operations on the stored data, such as database searching.

To access the contents or watch TV 102, the user 108 may first pick up the remote control 104, hold the remote control 104, and then use the remote control 104 to control TV 102 to display the desired contents. Also, during the watching period, the user 108 may use the remote control 104 to change the contents shown on TV 102.

More particularly, when the user 108 uses the remote control 104 to watch TV 102, a zoomable recommendation of contents may be displayed on TV 102 to assist the user 108 to select desired contents to watch. A zoomable recommendation, as used herein, refers to a graphical environment where users can change the scale of the viewed area in order to see more details or less details. A zoomable recommendation can be zoomed out to a small dot or a small icon, and can also be zoomed in to a full-screen display.

Figure 3:
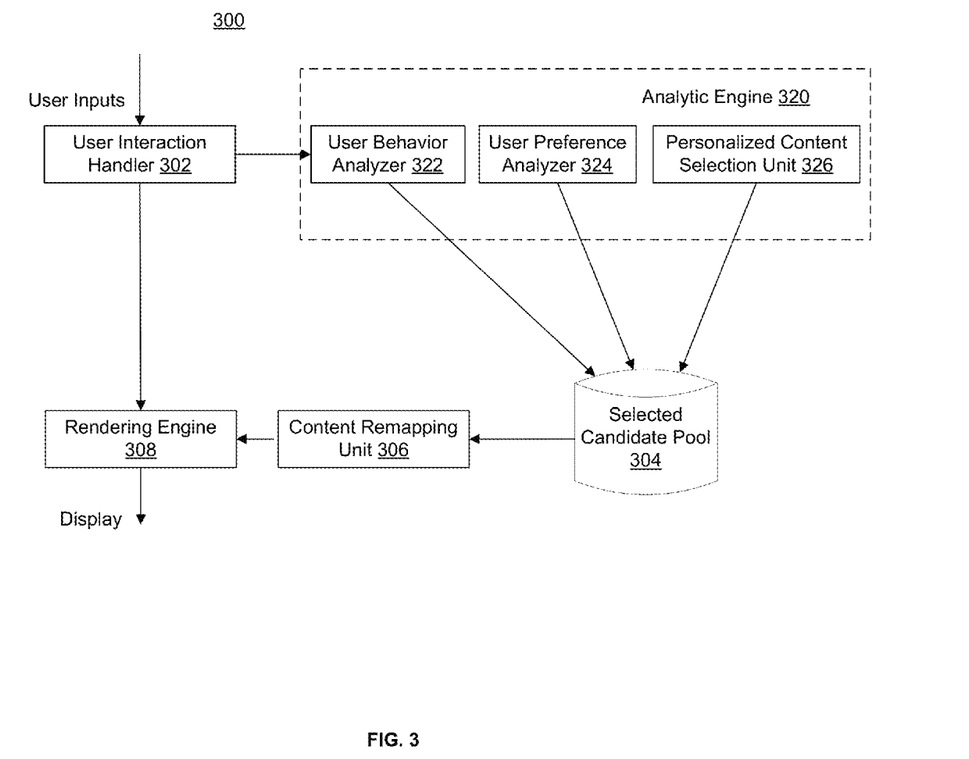
FIG. 3 illustrates an exemplary zoomable recommendation processing module consistent with the disclosed embodiments.

FIG. 3 illustrates an exemplary zoomable recommendation processing module 300 in the content delivery system 100 (e.g., TV 102, remote control 104, and/or network device 106) consistent with the disclosed embodiments. As shown in FIG. 3, zoomable recommendation processing module 300 includes a user interaction handler 302, a selected candidate pool 304, a content remapping unit 306, a rendering engine 308, and an analytic engine 320. Other components may be added. Further, the analytic engine 320 may include a user behavior analyzer 322, a user preference analyzer 324, and a personalized content selection unit 326. These modules and units may be implemented in various ways, such as by hardware, software, or a combination of hardware and software. For example, these modules and units may be implemented on computer system 200.

The recommendation processing module 300 may make recommendation for the user based on a variety of factors, such as the user's past interaction history and the database of content meta-data. The recommendation may be displayed in a specific format determined by the rendering engine 308. A certain number of recommendation items, i.e., recommendation candidates, may be determined or selected by the recommendation processing module 300 to be available for recommendation. That is, the recommendation processing module 300 may maintain a recommendation candidate pool 304 for making recommendations to the user.

The user interaction handler 302 may receive a user's inputs via an input device (e.g., remote control 104, a pointer, a mouse, etc.). After receiving a user input, the user interaction handler 302 may perform certain input processing, such as selecting a movie to watch or panning the screen, etc. Further, the user interaction handler 302 may determine whether the user input changes any of the current recommendation settings and/or contents. For example, the user interaction handler 302 may determine whether the contents of the recommendation candidate pool are changed by the user input.

If the user interaction handler 302 determines that the recommendation candidate pool is not changed, the user interaction handler 302 may cause rendering engine 308 to render the display of current recommendations. If the user interaction handler 302 determines that the recommendation candidate pool is changed, the user interaction handler 302 may cause the recommendation pool to be changed accordingly and the updated contents to be rendered by the rendering engine 308. For example, the content remapping unit 306 may remap the recommendations in the selected candidate pool.

More particularly, the analytic engine 320 may be used to determine whether the recommendation candidate pool is changed and/or to update the recommendation candidate pool. For example, the analytic engine 320 may perform certain data mining work, such as analyzing the user's behavior, mining the content database (i.e., the selected candidate pool 304), and determining the user's preference. After analyzing the data, the analytic engine 320 may make or update the recommendation in the selected candidate pool, i.e., the selected recommendation candidates.

More specifically, the user behavior analyzer 322 may monitor the user's interactions, detect the user's mood, and evaluate the user's behavior pattern (e.g., use pattern on the remote control). For example, a user may be able to fluently transverse the TV channel via digital keys on the remote control, a user may only limit him/herself in arrow keys to move around, or a user may use zooming functions frequently. The user analysis results of the user behavior analyzer 322 may be outputted to other modules or units, such as the personalized content selection unit 326.

The user behavior may analyze from many aspects in order to determine the relationships between user's behavior and his/her preferences. For example, the user behavior analyzer 322 may determine the current mood of the user by, e.g., the click pace of the user interaction, the content genre selected for watching, and so on;

The user behavior analyzer 322 may also determine the key usage pattern or the user's habit in utilizing the remote control. For example, some users may play remote control in a fluent manner, while others may only explore limited keys on the remote control. Also, the user behavior analyzer 322 may determine whether the user is a single consumer or a family by, e.g., the user's content selection. The men, women, kids, elders may have different taste on the content selection. For a family with members having almost the same taste, the family may be treated as a single consumer.

Figure 4:
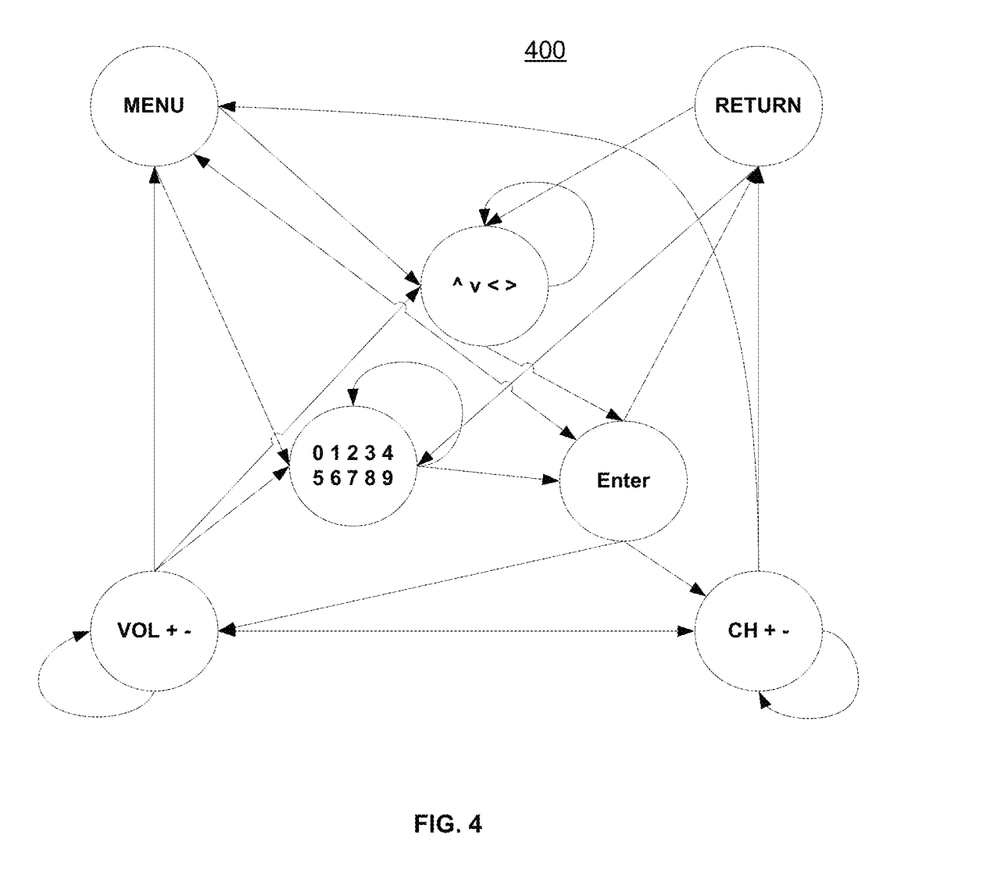
FIG. 4 illustrates an exemplary key transferring pattern consistent with the disclosed embodiments.

The user behavior analyzer 322 may also determine the usage model of the TV, for example, typical watching hours, frequency, content sources, and so on. Different people may have different key usage patterns, which includes the frequency of remote control usage, the frequency of certain key usage, and the frequency of certain key transferring. For example, the user behavior analyzer 322 may maintain probability tables for the usage patterns and use the probability tables in identifying the user or user group and the user's behavior model. FIG. 4 illustrates an exemplary key transferring pattern 400 consistent with the disclosed embodiments.

As shown in FIG. 4, for each arrowed curve, the destination node refers to the key just being pressed and the originating node refers to the key pressed earlier than that. The probabilities of these node transitions form a key transferring pattern, which may be used for the user behavior analysis.

More specifically, as shown in FIG. 4, key nodes include a "MENU" key, a "RETURN" key, a "VOLUME" key, a "CHANNEL" key, an "ENTER" key, an "ARROW" key, and a digital key, etc. Other key nodes may also be included. One key node may include one or more similar keys. For example, all digital keys may be considered as the same digital key, and thus transition from digital "3" to "5" would be represented by a self-loop. Certainly, it may also be feasible to separate all 10 digits into 10 nodes.

Provided that Pu(Ki) denotes the probability of using node (or key) Ki, and Pu(KiKj) denotes the probability of transition from node Ki to Kj, where i and j are the indices of the nodes, u is the index of the user, Pu(Ki) can be calculated as the total using frequency of node Ki divided by the total using frequency of all nodes, and similarly we can calculate Pu(KiKj). Further, a similarity evaluation may be used to determine whether there is a new user or a new mood of the user is recently introduced as:

$$\text{similarity} = \begin{cases} 1 & \text{if } \cos(P_{u1}(K_i), P_{u2}(K_i)) * \cos(P_{u1}(K_iK_j), P_{u2}(K_iK_j)) > T \\ 0 & \text{otherwise,} \end{cases} \quad (1)$$

where the u1 and u2 are different users in comparison, and T is a predetermined threshold that between [0, 1].

Returning to FIG. 3, as the user's preference may change during different mood or emotion, the user behavior analyzer 322 may also determine the current mood of the user or user group. For example, the user behavior analyzer 322 may link all contents into a database of vectors of emotion. Thus, from the user's recent content viewing history, the user behavior analyzer 322 may be able to derive the user mood.

On the other hand, the user behavior analyzer 322 may also map a remote control key press model into various emotions. Thus, from the user interaction behavior, a secondary opinion of user mood is determined. Similarly, the similarity between emotion vectors is compared and thus the current user mood is mapped into a category within the mood list.

After the analysis, the user behavior analyzer 322 may output analysis results to other modules, such as the user preference analyzer 324 and/or the personalized content selection unit 326 for further data processing.

The user preference analyzer 324 may monitor the user's viewing history within a certain time period and may identify a main interest of the user according to the user's viewing history, such as the user's selection of content genre, actor/actress, TV channel, and so on.

When analyzing a TV content, the TV content can be labeled as a vector $\langle X_i \rangle$, where $X_i$ belongs to $\{0, 1\}$ when representing a movie/program category type or actor/award information, for example, drama, horror, or action movie, and $X_i$ can also represents a TV channel which belongs to a larger integer set.

The user preference analyzer 324 may represent the user preference using a mixture of K Gaussian distributions (K=1 for the case $X_i$ is a binary value), where each Gaussian is weighted according to the frequency with which it belongs to the specific category. Thus, the probability that the user prefers Xt at time t may be estimated as:

$$P(X_t) = \sum_{i=1}^{K} w_{i,t} \frac{1}{\sqrt{2\pi}\,\sigma_i} e^{-\frac{1}{2}(X_t-\mu_{i,t})^T \sum^{-1} (X_t-\mu_{i,t})}, \quad (2)$$

where $w_{i,t}$ is the normalized weight, $\mu_i$ and $\sigma_i$ are the mean and the standard deviation of the i-th distribution.

Heuristically, the Gaussian distributions with the most supporting evidence and the least variance may indicate the likeliness of the distribution. The user preference analyzer 324 may sort the K distributions based on the value of w/σ and maintain an ordered list. Thus, the most likely distributions may be kept on top and the less probable state-transient distributions may be at the bottom.

The most likely distribution models for a content category may be obtained by:

$$B = \arg\min_b (\Sigma_{j=1}^{b} w_j / > T), \quad (3)$$

where the threshold T is the fraction of the total weight given to a specific category.

The user preference analyzer 324 may check the current user in evaluation against the existing K Gaussian distributions to detect if the distance between the mean of a distribution and the current preference value is within a predetermined range of the standard deviation of this distribution (e.g., 2.5 times of the standard deviation of this distribution). If none of the K distributions succeeds in the evaluation, the least probable distribution which has the smallest value of w/σ is replaced by a new Gaussian distribution with the current value as its mean, and a pre-assigned high variance and low prior weight. Otherwise, if the matched distribution is one of the B distributions, the user preference is marked.

The user preference analyzer 324 may keep this model adaptive, and may continuously update the model parameters using the next content selection from the same user. For the matched Gaussian distribution, all the parameters at time t are updated with this new value Xt. In addition, the prior weight is updated by:

$$w_t = (1-\alpha)w_{t-1} + \alpha, \quad (4)$$

and the mean and variance are updated by $$\mu_t = (1-\rho)\mu_{t-1} + \rho X_t, \quad (5)$$

and $$\sigma_t^2 = (1-\rho)\sigma_{t-1}^2 + \rho(X_t-\mu_t)^2, \quad (6)$$

where α is the learning rate controlling adaptation speed, 1/α defines the time constant which determines change, and ρ is the probability associated with the current user, scaled by the learning rate α. So ρ can be represented by $$\rho = \alpha \cdot \frac{1}{\sqrt{2\pi}\,\sigma_t} e^{-\frac{(X_t-\mu_t)^2}{\sigma_t^2}}. \quad (7)$$

For unmatched distributions, the mean $\mu_t$ and variance $\sigma_t$ remain unchanged, while the prior weight is updated by:

$$w_t = (1-\alpha)w_{t-1}. \quad (8)$$

Thus, the original preference distribution may remain in the mixture until it becomes the least probable distribution and a new preference is observed. If this static preference happens to change, the previous preference distribution can be reincorporated into the model.

After the analysis, the user preference analyzer 324 may output analysis results to other modules, such as the personalized content selection unit 326 for further data processing.

The personalized content selection unit 326 may automatically generate a recommendation candidate pool based on certain algorithm. For example, the personalized content selection unit 326 may use a hybrid approach that combines content-based filtering and collaborative filtering. The selected candidate pool set by the personalized content selection unit 326 may form a navigation closure box, and the content to be accessed by the user may have a relationship (e.g., a 6-degrees of connection) with the last content he/she showed interest or those he/she seems no interested.

More particularly, the personalized content selection unit 326 may select a candidate pool of contents based on the current user mood, the user's preferences, and other users' recommendations. For example, the personalized content selection unit 326 may determine the selected recommendation based on the following databases:

D: a content database with all titles/programs;
R: a database storing titles/programs that were recently selected by users in the same/similar interest groups compared to the current user;
U: a database storing content that the current user viewed in the recent time period.

Provided that <Yi> denotes the user preference vector, which corresponds to <Xi>, the content characteristic vector, the similarity between these 2 vectors can be calculated by:

$$Sim(X, Y) = \cos(X_i, Y_i) = \frac{X_i \cdot Y_i}{\|X_i\|\|Y_i\|}. \quad (9)$$

The personalized content selection unit 326 may then use certain criteria to select recommendation content. For example, one criteria may include: 80% of the selections are top-ranked items (obtained from Equation 9) in D that are not in U, and 20% of the selections are top-ranked items in R that are not in U.

After determining all the selections, the personalized content selection unit 326 may perform a renormalization process to get the normalized similarity of k-th content selected:

$$Pr(k) = \frac{Sim(X_k, Y_k)}{\sum_{i=1}^{N} Sim(X_i, Y_i)}, \quad (10)$$

where N is the total number of selections in the pool. The total number of N may be determined based on specific applications as well as the data structure used to for make recommendation to the user.

Figure 5:
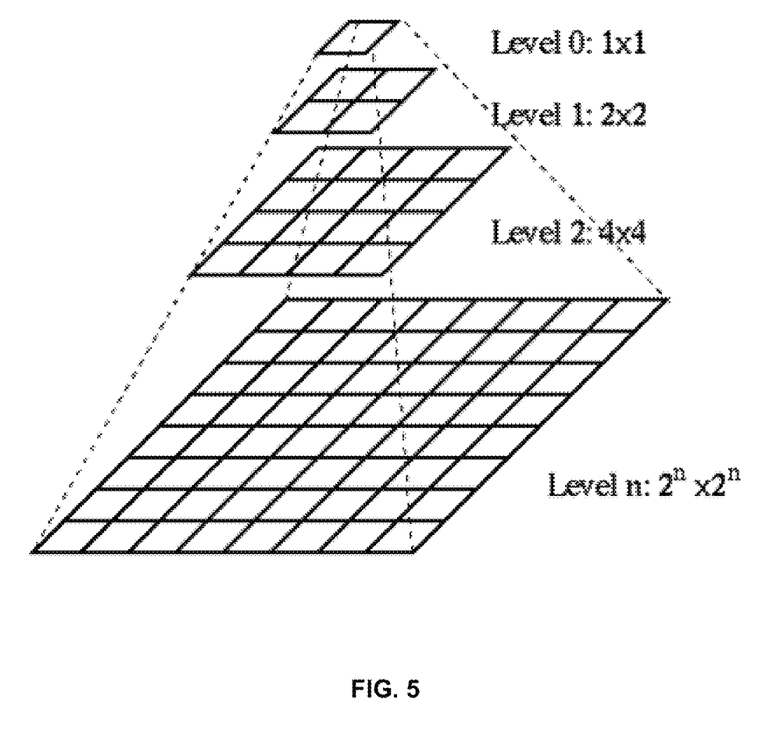
FIG. 5 illustrates an exemplary pyramid hierarchical data structure consistent with the disclosed embodiments.

After the selected candidates pool 304 is created, i.e., the recommendation contents are determined. To support zoomable recommendation, the content remapping unit 306 may map the selected contents onto a desired data structure. In certain embodiments, the content remapping unit 306 may map the selected contents onto a pyramid structure that supports zoomable access. FIG. 5 illustrates an exemplary pyramid hierarchical data structure consistent with the disclosed embodiments.

As shown in FIG. 5, the selected contents, e.g., all the titles that are ready for recommendation, are mapped onto a pyramid-like hierarchical data structure. The pyramid data structure may include a plurality of levels (i.e., zoomable recommendation levels), from level 0 (the top level or the highest level) to level n (the bottom level or the lowest level), and n is the total number of zoomable recommendation levels. Further, an upper level of the pyramid may be an abstraction of its associated lower levels.

More specifically, the recommendation level 0 may include one content area (1×1), level 1 may include four content areas (2×2), level 2 may include 16 content areas (4×4), and level n may include $2^{2n}$ content areas ($2^n \times 2^n$). Each content area may be represented by one or more title or program allocated into the content area. Further, the lowest recommendation level (i.e., level n) may display all the selected contents without abstraction. Thus, the total number N of the selected recommendation titles or programs may be $2^{2n}$. A larger total number may be used with a certain number of abstraction and any appropriate total number may be used.

The content remapping unit 306 may set an initial recommendation level around the middle of the total recommendation levels, such that the user may start by accessing a mid-level of pyramid with allocated titles. In certain embodiments, the content remapping unit 306 may also set the initial recommendation level as the first level (i.e., level 0) or may set the initial recommendation level as configured by the user.

After the recommendation is made to the user at the initial recommendation level, the user may change the recommendation level, i.e., a zoom operation, using any appropriate input device. That is, when the user wants to see more recommendations in a specific area, the user may use a specific touch-screen gesture or press a button in a motion-sensor based remote control to zoom in, then the next lower level of pyramid with titles are rendered with the same pivot center point. Thus, the user may be able to view more relevant titles around the local zoom-in point. Similarly, the zoom-out operation triggers to render the upper level of titles in the pyramid. When the recommendation level goes to level 0 (i.e., the top level), only the most representative recommendations may be rendered, which may have a large-range of diversity. The top level may also be displayed by a single icon as the abstract of the lower level recommendation contents or as an indication for the zoomable recommendation operation.

Further, the user may also change the viewing content. The selected candidate pool may be updated according to the changes made by the user. If no update is made, the selected candidate pool is unchanged; otherwise the selected candidate pool is changed.

The selected contents may be connected or related with each other in a various ways, i.e., in an M-dimension space. However, the mapped contents may be limited to a limited number of dimensions, such as a 2D-dimension space. Thus, the content remapping unit 306 may first reduce the dimensions of the selected contents.

Figure 6A:
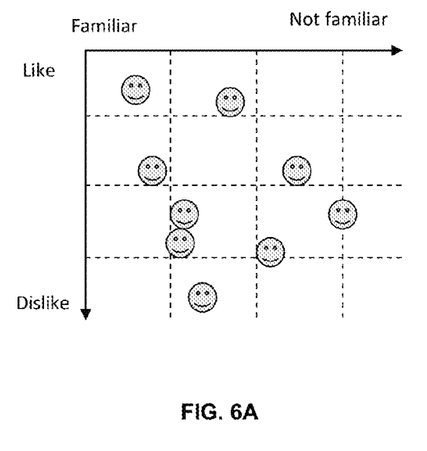
FIG. 6A illustrates an exemplary likeness-familiarity 2D space consistent with the disclosed embodiments.

For example, for a 2D dimensional reduction, the user may specify (or configure) meaning of the 2D axis. FIG. 6A illustrates an exemplary likeness-familiarity 2D space. As shown in FIG. 6A, the horizontal axis (i.e., the x-axis) may indicate the familiarity, i.e., whether the user is familiar with a certain content, and the vertical axis (i.e., the y-axis) may indicate the likeness, i.e., whether the user likes a certain content. Thus, the contents are mapped into a likeness-familiarity space.

Figure 6B:
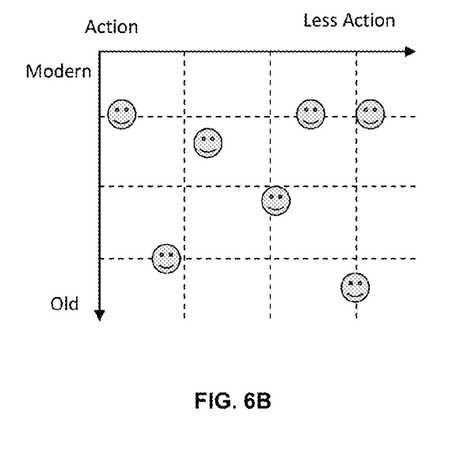
FIG. 6B illustrates an exemplary age-action 2D space consistent with the disclosed embodiments.

Other dimensions may also be used. For example, FIG. 6B illustrates an exemplary age-action 2D space. As shown in FIG. 6B, the x-axis may indicate the action genre information, and the y-axis may indicate the age/time information of a content. Thus, the contents may be mapped into an age-action space. The value of content on each axis may be determined and, thus, each content may have a 2D coordinate in the map.

Figure 7:
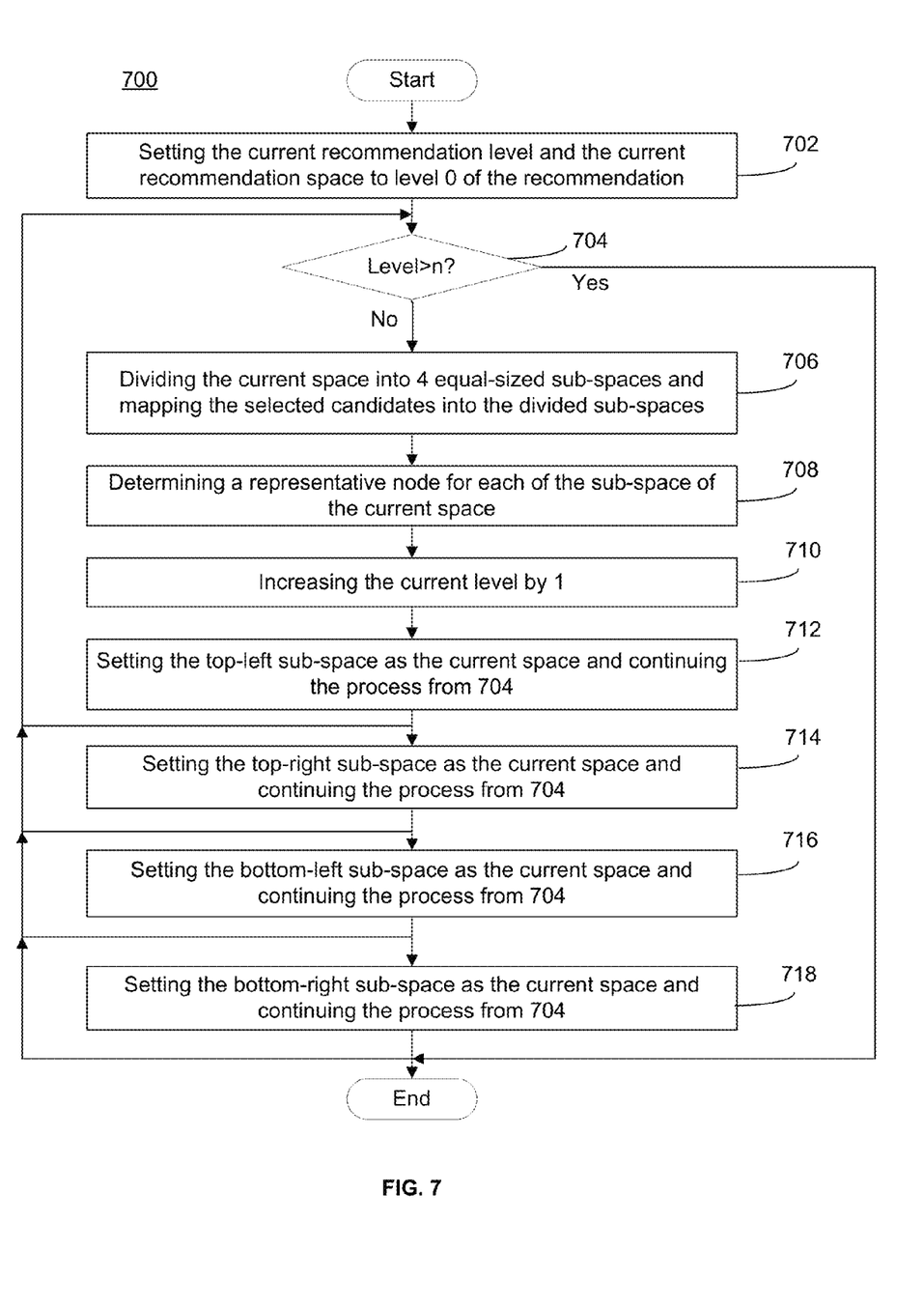
FIG. 7 illustrates an exemplary mapping process consistent with the disclosed embodiments.

Returning to FIG. 3, after the dimension reduction, the content remapping unit 306 may map the selected recommendation candidates into the levels of the pyramid hierarchical data structure. That is, a total of $2^{2n}$ recommendation candidates generated during the candidate pool generation process may be mapped into each level of the pyramid-like hierarchical data structure. Because the 2D space of each recommendation level is represented by $2^{2a}$ grids, where a is the level number (0, 1, 2, ..., n), the selected $2^n \times 2^n$ candidates may be mapped into the $2^{2a}$ grids (when a is n, the selected $2^n \times 2^n$ candidates may be mapped into the $2^{2n}$ grids). FIG. 7 illustrates an exemplary mapping process 700 consistent with the disclosed embodiments.

As shown in FIG. 7, at the beginning, the current recommendation level is set to 0, and the current recommendation space, i.e., the content area, is set to the single content area of level 0 (702). Optionally, a title ranked highest from the selected candidate pool may be chosen to represent the level 0 single content area or a predefined icon may be used to represent the level 0 single content area. Further, it is determined whether the current recommendation level is greater than n (i.e., the lowest level) (704). If the current level is greater than n (704; yes), the process 700 completes.

On the other hand, if the current level is not greater than n (704; no), the current space is divided into 4 equal-sized areas or sub-spaces and the selected candidates are mapped into the divided sub-spaces or areas (706). A selected candidate may be referred to as a node and a sub-space or content area may be represented by a grid, as explained previously. The node coordinates may also be normalized to make the bounding box of all nodes fully overlapped with the grid or content space.

Thus, a total $2^{2n}$ nodes are mapped into the 4 grids and each grid or area may contain a same number of nodes. If each grid or area does not contain same number of node, some nodes on the boundary may be moved from one grid to another. The nodes may be moved using a predetermined algorithm. For example, the node movement may be determined by an optimization process that minimizes the total moving distances of the nodes to be moved. More particularly, for the 4-grid configuration, the nodes in sub-spaces that exceed ¼ of the total node in the current space are moved. For the grid or sub-space with exceeding nodes, those most close to the center point of the current space are determined and moved the sub-spaces with less nodes.

After all the nodes are mapped into the 4 grids, each having same number of nodes, a representative node is determined for each of the sub-space of the current space (708). The representative node can be one ranked highest from the recommendation content pool among all nodes in the corresponding space or sub-space.

Further, if the current level mapping is completed, the current level is increased by 1 (710). The current space is recorded for recursive operations. Then, the top-left sub-space is set as the current space and the process continues from 704 (712); the top-right sub-space is set as the current space and the process continues from 704 (714); the bottom-left sub-space is set as the current space and the process continues from 704 (716); and the bottom-right sub-space is set as the current space and the process continues from 704 (718).

Figure 8:
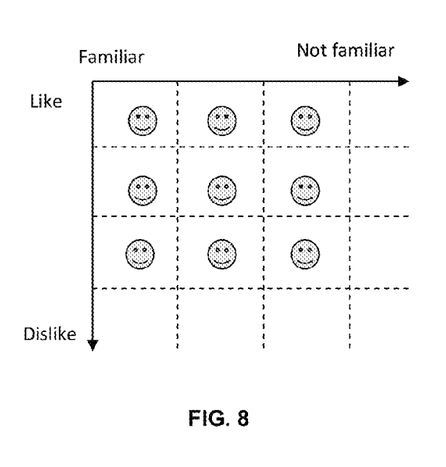
FIG. 8 illustrates certain number of contents mapped into the likeness-familiarity 2D space consistent with the disclosed embodiments.

Thus, after the process 700 completes, each level of the pyramid-like hierarchical structure are mapped with the selected candidate pool. FIG. 8 illustrates certain number of contents mapped into the likeness-familiarity 2D space or grids. As shown in FIG. 8, each grid may contain a single title (e.g., at a low level). Certainly, other levels may have more than one titles in a single grid, and a representative title may be determined to represent the grid or content space. During the rendering process, in each level, the representative nodes may be shown as current recommendations to the user.

Further, after the content remapping unit 306 maps or remaps the selected recommendation candidates to the hierarchical data structure, the rendering engine 308 is configured to render the final chosen recommendations to be displayed to the user.

By using the disclosed systems and methods, many advantageous applications can be implemented. For example, a zoomable recommendation can be displayed to the user for content entertainment selection. From user experience point of view, the disclosed systems and methods enable hierarchical content discovery based recommendation, and organize content according to the user preferences as well as the connections among contents to achieve a pyramid-like hierarchical structure with a content remapping algorithm.

It is understood that the disclosed zoomable recommendation model is not limited to TV usage scenario. The disclosed systems and methods can also be easily extended and applied to mobile devices such as cell phones and tablets, as well as PCs. Further, although video content recommendation is disclosed for illustrative purposes, similar concept and approach can be easily extended to other recommendation solutions, for example, application recommendation, restaurant recommendation, and house recommendation and so on. Other applications, advantages, alternations, modifications, or equivalents to the disclosed embodiments are obvious to those skilled in the art.

What is claimed is:

1. A method for a content recommendation module, comprising:
    receiving a user input related to viewing contents from a user;
    determining that a recommendation pool containing a plurality of selected recommendation candidates has been changed corresponding to the input;
    when the recommendation pool has been changed, mapping the plurality of selected recommendation candidates in the changed recommendation pool into a hierarchical data structure with a plurality of levels such that each of the plurality of levels acts as a stage of a zoom operation on the selected recommendation candidates, wherein the hierarchical data structure has a center point being a most representative recommendation, and recommendation candidates at each of the plurality of levels are related in content to the center point and rendered around the center point; and
    rendering mapped recommendation candidates from the plurality of levels to be displayed to the user,
    wherein mapping the plurality of selected recommendation candidates further includes:
        dividing a space of each of the plurality of levels into sub-spaces;
        mapping the recommendation candidates into the divided sub-spaces; and
        when each sub-space at a same level does not contain the same number of recommendation candidates, moving extra recommendation candidates from a certain sub-space of the same level to one or more sub-spaces of the same level with less recommendation candidates.

2. The method according to claim 1, wherein:
the plurality of selected recommendation candidates are selected based on at least a user behavior pattern.

3. The method according to claim 2, wherein:
the user behavior pattern is a remote control key transferring pattern represented by probabilities of remote control key node transitions, wherein a remote control key node includes one or more similar remote control keys.

4. The method according to claim 3, wherein:
provided that Pu(Ki) denotes a probability of using remote control key node Ki, and Pu(KiKj) denotes a probability of transition from remote control key node Ki to remote control key node Kj, where i and j are indices of the remote control key nodes, u is an index of the user, Pu(Ki) is calculated as a total using frequency of remote control key node Ki divided by a total using frequency of all remote control key nodes.

5. The method according to claim 1, wherein:
the plurality of selected recommendation candidates are selected based on at least a user preference determined based on a viewing history of the user.

6. The method according to claim 1, further including:
selecting the recommendation candidates based on mood of the user, preference of the user, and recommendations for other users.

7. The method according to claim 6, further including:
selecting the recommendation candidates using a content database with all titles, a database storing titles that were recently selected by other users in substantial similar interest groups as the user, and a database storing content that the user viewed in a recent time period.

8. The method according to claim 1, wherein:
the hierarchical data structure is a pyramid hierarchical data structure with a plurality of levels and, provided that n is a level number, a total number of the recommendation candidates at each of the plurality of levels is determined as $2^n \times 2^n = 2^{2n}$; and
a top level is displayed by a single icon as an indication for zoomable recommendation operation.

9. The method according to claim 1, further including:
setting an initial recommendation level around middle of the plurality of levels, such that the user starts by accessing a mid-level of the hierarchical data structure.

10. The method according to claim 1, further including:
reducing dimensions of the recommendation candidates to a 2D dimension.

11. The method according to claim 1, wherein mapping the plurality of selected recommendation candidates further includes:
a. setting a current recommendation level to level 0 and a current space of the level 0;
b. determining that the current recommendation level is not greater than a predetermined value;
c. increasing the current recommendation level by a step value
d. dividing the current space into a plurality of equal-sized sub-spaces;
e. mapping the recommendation candidates into the divided sub-spaces such that each sub-space contains same number of recommendation candidates; and
f. repeating steps be until the current recommendation level is greater than the predetermined value.

12. The method according to claim 11, further including:
when a sub-space is mapped into more than one recommendation candidates, determining a representative content to represent the more than one recommendation candidates to represent the sub-space when displaying the recommendation to the user.

13. A content recommendation module, comprising:
a database configured to store a recommendation pool containing a plurality of selected recommendation candidates;
a user interaction handler configured to receive a user input related to viewing contents from a user and to determine that the recommendation pool has been changed corresponding to the input;
a content remapping unit configured to, when the recommendation pool has been changed, map the plurality of selected recommendation candidates in the changed recommendation pool into a hierarchical data structure with a plurality of levels such that each of the plurality of levels acts as a stage of a zoom operation on the selected recommendation candidates, wherein the hierarchical data structure has a center point being a most representative recommendation, and recommendation candidates at each of the plurality of levels are related in content to the center point and rendered around the center point; and
a rendering engine configured to render mapped recommendation candidates from the plurality of levels to be displayed to the user,
wherein, to map the plurality of selected recommendation candidates, the content remapping unit is further configured to:
divide a space of each of the plurality of levels into sub-spaces;
map the recommendation candidates into the divided sub-spaces; and
when each sub-space at a same level does not contain the same number of recommendation candidates, move extra recommendation candidates from a certain sub-space of the same level to one or more sub-spaces of the same level with less recommendation candidates.

14. The content recommendation module according to claim 13, wherein:
the plurality of selected recommendation candidates are selected based on at least a user behavior pattern.

15. The content recommendation module according to claim 14, wherein:
the user behavior pattern is a remote control key transferring pattern represented by probabilities of remote control key node transitions, wherein a remote control key node includes one or more similar remote control keys.

16. The content recommendation module according to claim 15, wherein:
provided that Pu(Ki) denotes a probability of using remote control key node Ki, and Pu(KiKj) denotes a probability of transition from remote control key node Ki to remote control key node Kj, where i and j are indices of the remote control key nodes, u is an index of the user, Pu(Ki) is calculated as a total using frequency of remote control key node Ki divided by a total using frequency of all remote control key nodes.

17. The content recommendation module according to claim 13, wherein:
the plurality of selected recommendation candidates are selected based on at least a user preference determined based on a viewing history of the user.

18. The content recommendation module according to claim 13, further including:

selecting the recommendation candidates based on mood of the user, preference of the user, and recommendations for other users.

19. The content recommendation module according to claim 18, further including:
an analytic engine configured to select the recommendation candidates using a content database with all titles, a database storing titles that were recently selected by other users in substantial similar interest groups as the user, and a database storing content that the user viewed in a recent time period.

20. The content recommendation module according to claim 13, wherein:
the hierarchical data structure is a pyramid hierarchical data structure with a plurality of levels and, provided that n is a level number, a total number of the recommendation candidates at each of the plurality of levels is determined as $2^n \times 2^n = 2^{2n}$; and
a top level is displayed by a single icon as an indication for zoomable recommendation operation.

21. The content recommendation module according to claim 13, wherein the content remapping unit is further configured to:
a. set a current recommendation level to level 0 and a current space of the level 0;
b. determine that the current recommendation level is not greater than a predetermined value;
c. increase the current recommendation level by a step value
d. divide the current space into a plurality of equal-sized sub-spaces;
e. map the recommendation candidates into the divided sub-spaces such that each sub-space contains same number of recommendation candidates; and
f. repeat steps b-e until the current recommendation level is greater than the predetermined value.

22. The content recommendation module according to claim 21, wherein the content remapping unit is further configured to:
when a sub-space is mapped into more than one recommendation candidates, determine a representative content to represent the more than one recommendation candidates to represent the sub-space when displaying the recommendation to the user.

\* \* \* \* \*